(12) United States Patent
Kuo et al.

(10) Patent No.: US 7,408,698 B2
(45) Date of Patent: Aug. 5, 2008

(54) PORTABLE DISPLAY DEVICE USING ELECTROPHORETIC DISPLAY

(75) Inventors: Szu-Wei Kuo, Tu-Cheng (TW); Wen-Chu Wang, Tu-Cheng (TW); Juan Li, Shenzhen (CN)

(73) Assignees: Hong Fu Jin Precision (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/309,547

(22) Filed: Aug. 18, 2006

(65) Prior Publication Data

US 2007/0146307 A1   Jun. 28, 2007

(30) Foreign Application Priority Data

Dec. 26, 2005   (CN) .................. 2005 2 0121170

(51) Int. Cl.
 *G02B 26/00* (2006.01)
(52) U.S. Cl. ..................... 359/296; 430/32; 204/450
(58) Field of Classification Search .......... 359/296; 430/32, 34, 38; 204/450, 600; 345/105, 345/107
See application file for complete search history.

(56) References Cited

U.S. PATENT DOCUMENTS

| 5,351,995 | A | | 10/1994 | Booker | |
|---|---|---|---|---|---|
| 5,757,363 | A | * | 5/1998 | Oishi et al. | 345/173 |
| 5,864,178 | A | * | 1/1999 | Yamada et al. | 257/737 |
| 6,337,761 | B1 | | 1/2002 | Rogers et al. | |
| 6,865,010 | B2 | | 3/2005 | Duthaler et al. | |
| 7,110,162 | B2 | * | 9/2006 | Wu et al. | 359/296 |
| 7,161,732 | B2 | * | 1/2007 | Kanbe | 359/296 |
| 2005/0174321 | A1 | * | 8/2005 | Ikeda et al. | 345/107 |
| 2007/0212022 | A1 | * | 9/2007 | Zhou et al. | 386/94 |

* cited by examiner

*Primary Examiner*—Timothy J Thompson
(74) *Attorney, Agent, or Firm*—Wei Te Chung (57) ABSTRACT

A portable display device includes a flexible electrophoretic display, a circuit board electrically connected to the display, and a base receiving and securing the display and the circuit board therein. The display includes a pair of electrodes for providing an electric field therebetween, and a microcapsule layer positioned between the electrodes. The circuit board is electrically connected to the electrodes of the display for providing power to the electrodes and controlling the electric field generated between the electrodes. The base comprises at least two portion foldable to each other to thereby allow the display to be foldable with the at least two portions.

19 Claims, 7 Drawing Sheets

PORTABLE DISPLAY DEVICE USING ELECTROPHORETIC DISPLAY

FIELD OF THE INVENTION

The present invention generally relates to portable display devices, and in particular to a portable display device using an electrophoretic display.

DESCRIPTION OF RELATED ART

In today's advancing electronics industry public demand is for greater portability, smaller and lighter are considered superior characteristics of electronic devices. However, conventional display device technology is reaching a limit in just how small a display can be made that still adequately provides a quality image. Typical display devices utilize a rigid design that doesn't allow for compact storage and mobility.

What is needed is a portable display device which overcomes the above-mentioned problems.

SUMMARY OF THE INVENTION

An exemplary portable display device includes a flexible electrophoretic display, a circuit board electrically connected to the display, and a base receiving and securing the display and the circuit board therein. The display includes a pair of electrodes for providing an electric field therebetween, and a microcapsule layer positioned between the electrodes. The circuit board is electrically connected to the electrodes of the display for providing power to the electrodes and controlling the electric field generated between the electrodes. The base comprises at least two portion foldable to each other to thereby allow the display to be foldable with the at least two portions.

Other systems, methods, features, and advantages of the present portable display device will be or become apparent to one with skill in the art upon examination of the following drawings and detailed description. It is intended that all such additional systems, methods, features, and advantages be included within this description, be within the scope of the present apparatus, and be protected by the accompanying claims.

BRIEF DESCRIPTION OF THE DRAWINGS

Many aspects of the present portable display device can be better understood with reference to the following drawings. The components in the drawings are not necessarily to scale, emphasis instead being placed upon clearly illustrating the principles of the present device. Moreover, in the drawings, like reference numerals designate corresponding parts throughout the several views.

DETAILED DESCRIPTION OF THE INVENTION

Reference will now be made to the drawings to describe the embodiments of the present portable display, in detail.

Figure 1:
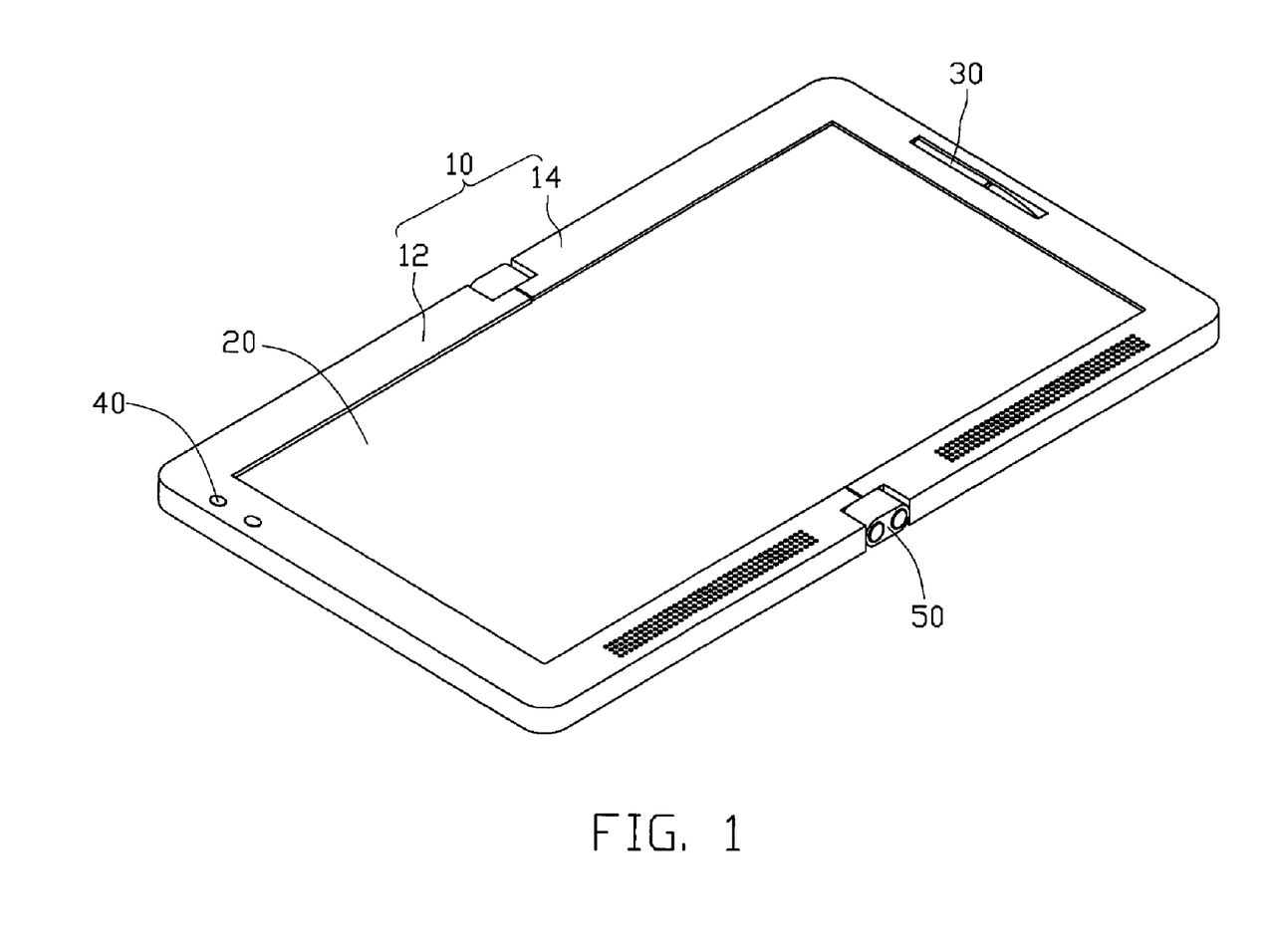
FIG. 1 is an isometric view of a portable display device in an unfolded state, according to a first embodiment, the portable display device including a display and a circuit board.

Referring to FIG. 1, the portable display device in accordance with a first embodiment includes a base 10, a display 20, a stylus 30, a plurality of buttons 40, and a hinge 50. The base 10 is a main body of the portable display device, and is divided into a first portion 12 and a second portion 14 by the hinge 50. The first and second portions 12, 14 are rotatable with respect to each other around an axis of the hinge 50. The display 20 is fixed in a rectangular frame of the base 10. The stylus 30 is removably fixed to a side of the base 10 for entering information on the display 20. The buttons 40 are arranged at a corner or corners of the base 10 to activate designated functions.

Figure 2:
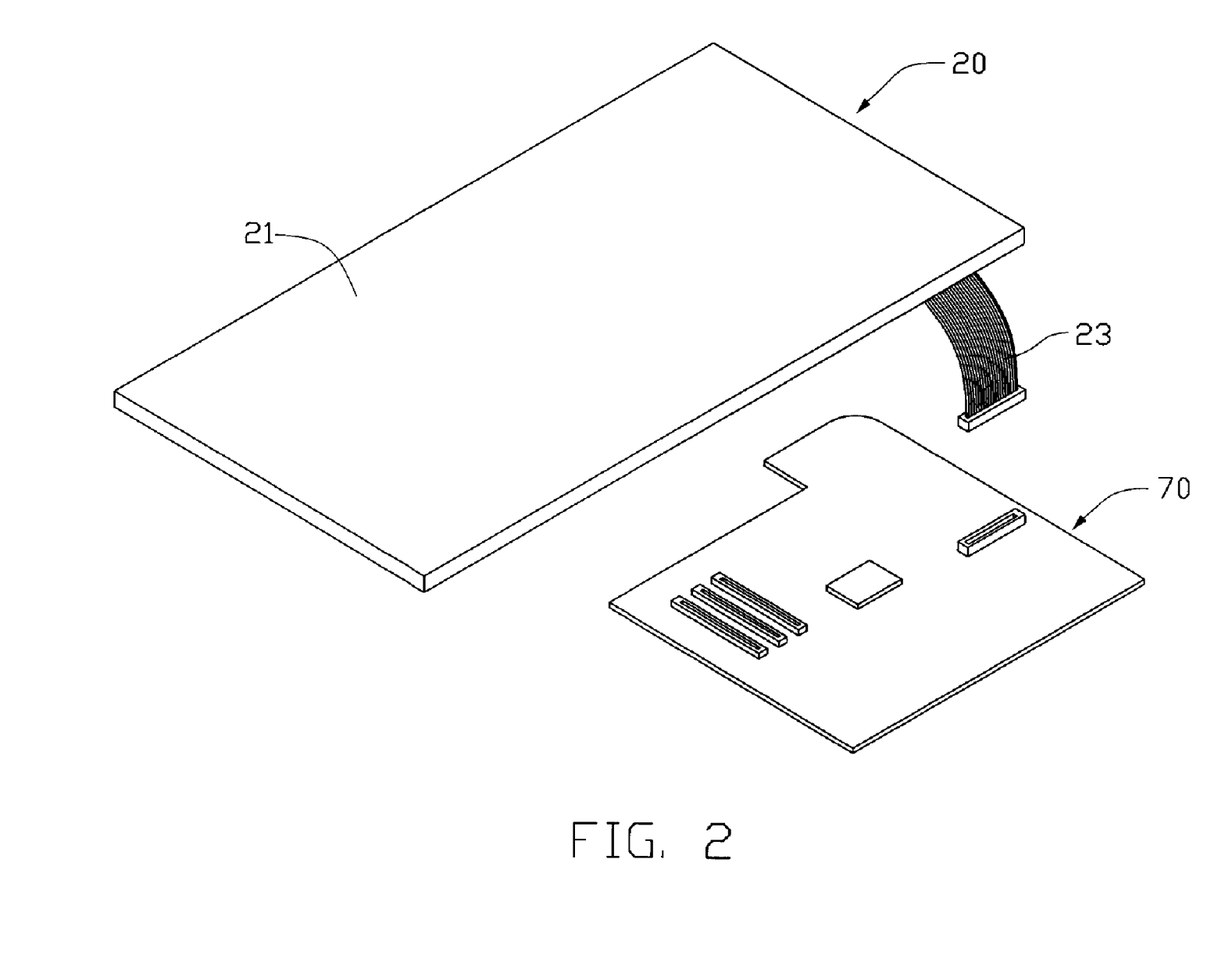
FIG. 2 is a schematic view showing the display and the circuit board of the portable display device of FIG. 1.

Also referring to FIG. 2, the display 20 is embedded in the base 10 with a viewing surface 21 thereof exposed to users. The display 20 is electrically connected to a circuit board 70 via a flexible cable 23 to achieve data transmission between the circuit board 70 and the display 20. The circuit board 70 is secured in the base 10, under the display 20. The circuit board 70 is a controller and a power supplier of the display 20.

Usually, displays can be sorted into a luminous type display and a non-luminous type display according to their light sources. Cathode-ray tube (CRT) displays are typical luminous type displays but occupy a lot of space. Liquid crystal displays (LCDs) are typical non-luminous type displays. An LCD is a kind of rigid flat panel display with a relatively smaller thickness.

The above-mentioned kinds of displays are unsatisfactory in flexibility. An electrophoretic display is a flexible and foldable flat panel non-luminous type display, which utilizes electrophoresis. In electrophoresis, to create an image, an electric field is applied to a dispersion liquid having particulates dispersed in a liquid phase dispersion medium, particles naturally charged by the dispersion (electrophoretic particles) migrate according to a Coulomb force to create a desired image. The display 20 is such a flexible electrophoretic display.

Figure 3:
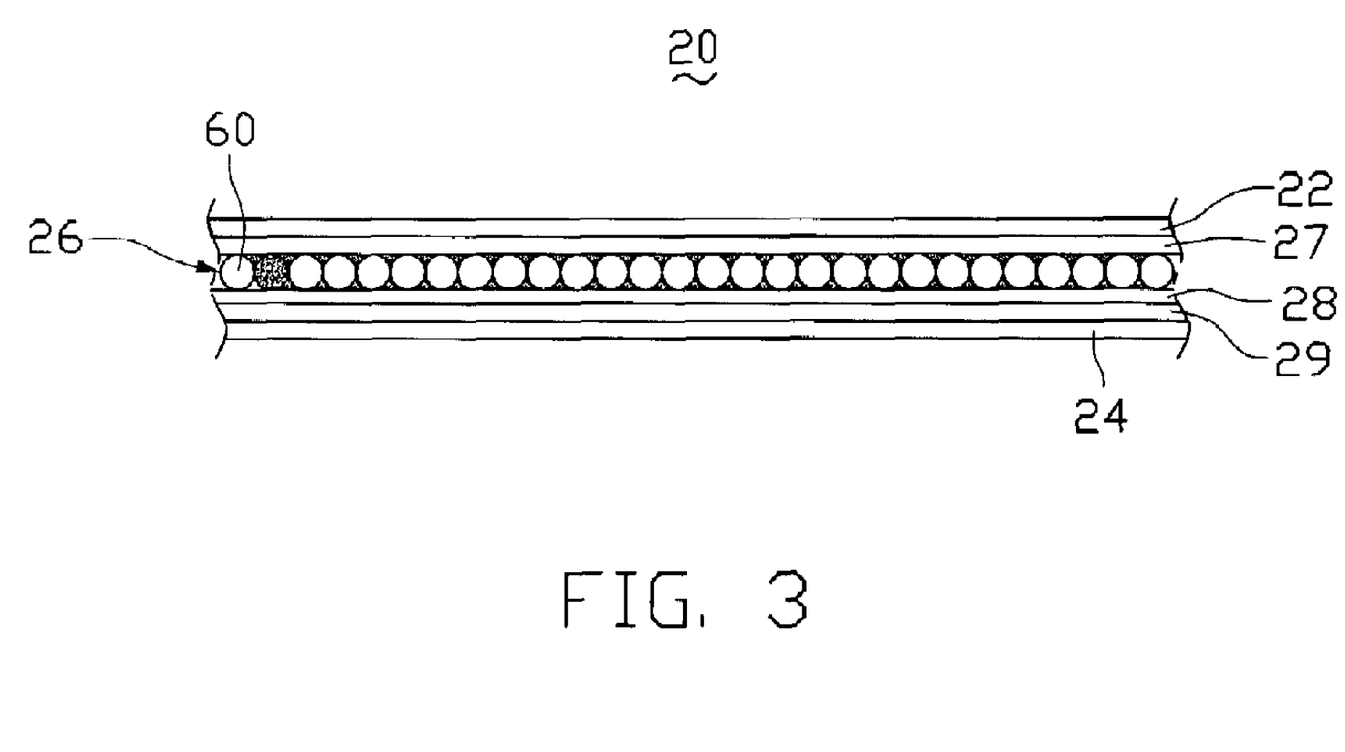
FIG. 3 is a schematic view showing a cross-section of the display.

Referring to FIG. 3, a cross-section of the display 20 is illustrated. The display 20 includes a first substrate 22, a second substrate 24, a microcapsule layer 26, a first electrode 27, and a second electrode 28. The microcapsule layer 26 is constructed by a plurality of procumbent microcapsules 60. The microcapsules 60 are transparent, and are glued together with transparent adhesive. The first electrode 27 and the second electrode 28 are respectively positioned at two opposite sides of the microcapsule layer 26 at a predetermined interval, to provide an electric field therebetween. The first and second substrates 22, 24 are respectively positioned at the two opposite sides of the microcapsule layer 26 to sandwich and protect the microcapsule layer 26 and the first and second electrodes 27, 28. One of the first and second electrodes 27, 28 is a common electrode, and the other is a pixel electrode to provide an electric difference in potential with respect to the common electrode. At least one of the first and second electrodes 27, 28 is transparent and at least one of the first and second substrates 22, 24 adjacent to the transparent electrode is transparent. The transparent electrode is set as the viewing surface 21. In order to be flexible, the first and the second substrates 22, 24 can be chosen to be made of plastic material. The display 20 can be made by plastic transistor technology.

Plastic transistor technology is process whereby circuits are formed on plastic such as flexible plastic used in the present embodiment.

Figure 4:
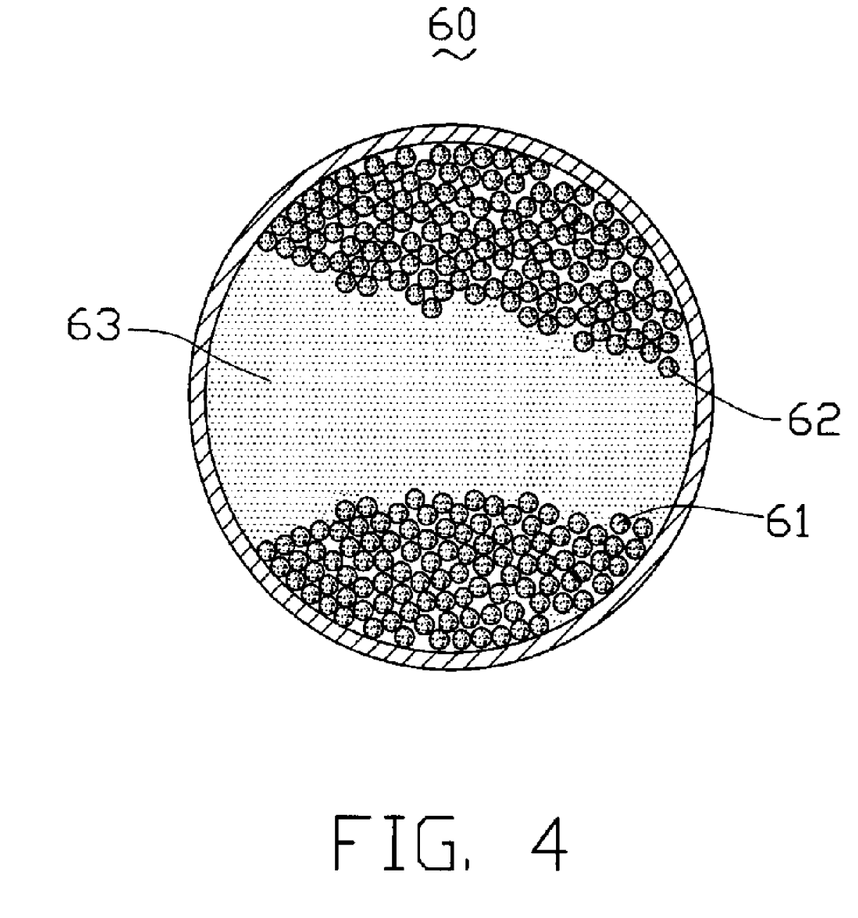
FIG. 4 is a schematic view showing architecture of a microcapsule in the display.

A detailed structure of the microcapsules is shown in FIG. 4. Each microcapsule 60 encloses a plurality of color particles 61, white particles 62, and a dispersing medium 63 for the particles 61, 62. The color particles 61 are selected from red (R) particles, green (G) particles, and blue (B) particles, while the white particles 62 are used as non-display particles. The color particles 61 and the white particles 62 carry unlike charges. That is, the color particles 61 have a positive charge and the white particles have a negative charge, or vice-versa. The dispersing medium 63 is encapsulated to separate the color particles 61 from the white particles 62, preventing the color particles 61 and the white particles 62 from collecting together due to their mutual attraction to each other. When a given electric potential difference is provided to the first and second electrodes 27, 28, the color particles 61 and the white particles 62 are arranged in a desired pattern. The desired pattern remains viewable without further power needing to be supplied until a next electric potential is provided to the first and second electrodes 27, 28 thus creating a new desired pattern. In this way, desired images and text are accordingly presented on the viewing surface 21. A diameter of the microcapsules 60 is from 30 to 100 micrometers (μm), so the display 20 has high definition and contrast. Because the display 20 is a non-luminous display with low radiation, it is suitable for prolonged viewing. Moreover, since power is not required by the display 20 for continuous display of a given desired pattern, the display 20 has relatively lower power consumption.

In order to use the stylus 30 as an input device, a pressure sensor 29 is inserted between the microcapsule layer 26 and one of the substrates 22, 24. The pressure sensor 29 is used for sensing a pressure applied thereon. The pressure sensor 29 is connected to the circuit board 70, and transmits a signal, which is input to the circuit board 70 in response to an applied pressure thereon. The circuit board 70 receives the signal, and responds to the input in a pre-determined desired manner. For example, a location of the applied pressure on the screen may correspond to a user selecting a function from a menu viewed on the display 20 and applying the stylus 30 thereto, or the pressure applied may result in an image depicting the patterns of applied pressure for forming a picture or handwritten text to be stored in a memory or transmitted by some communication medium.

Figure 5:
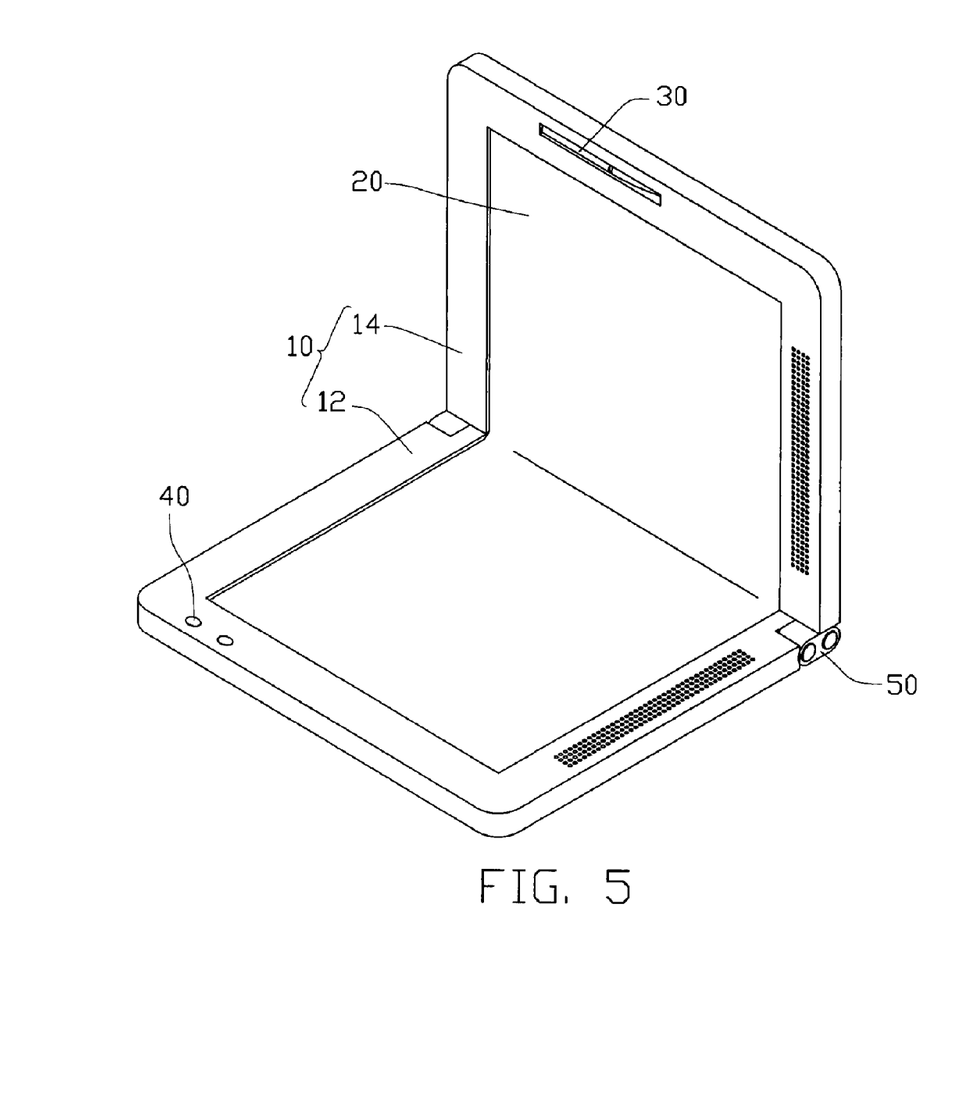
FIG. 5 is an isometric view of the portable display device of FIG. 1, showing a half-folded state thereof.
Figure 6:
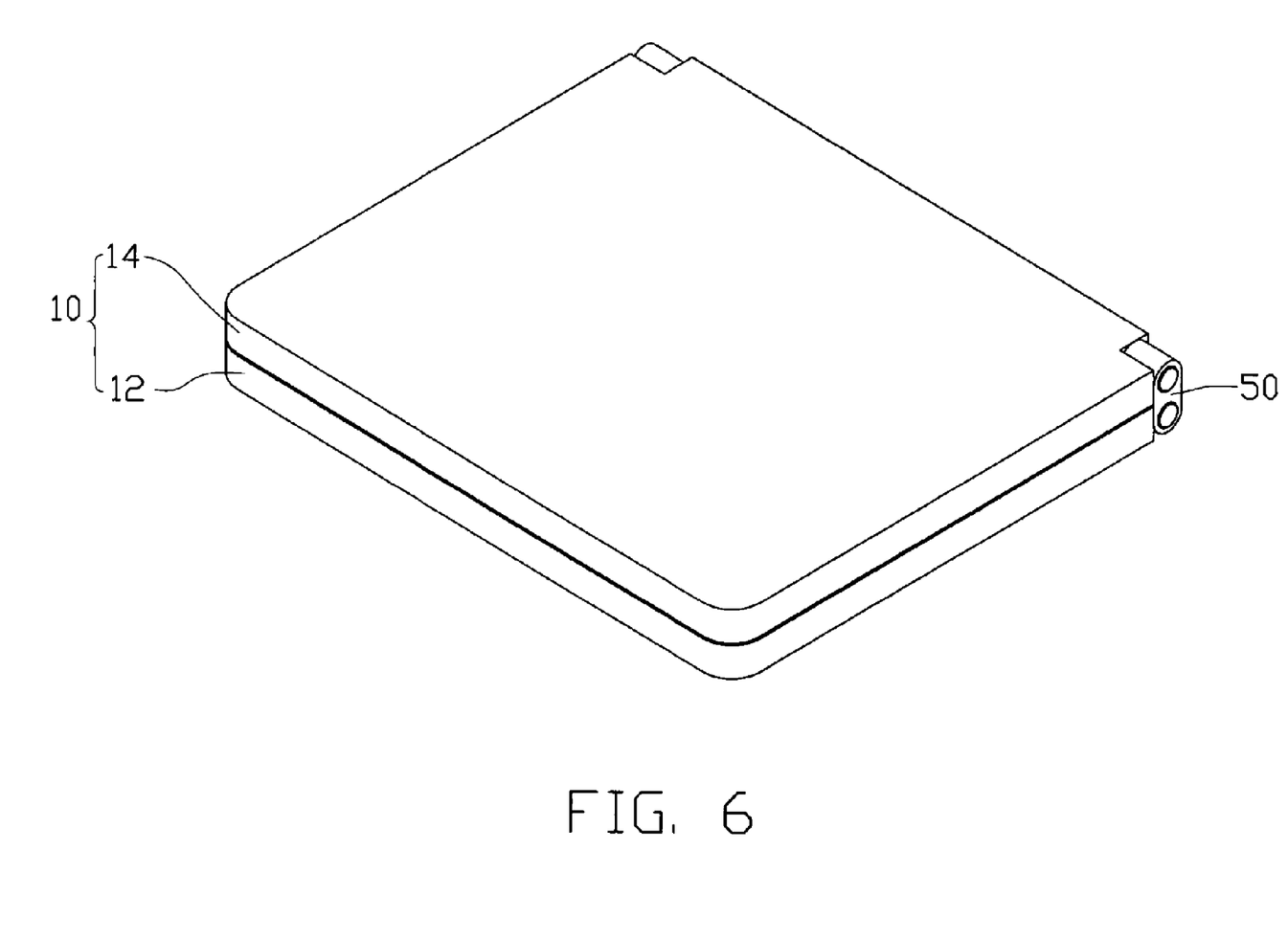
FIG. 6 is an isometric view of the portable display device of FIG. 1, showing a fully-folded state thereof.

Referring to FIG. 5 and FIG. 6, two different states of the portable display device are respectively illustrated. The portable display device can be folded for compact storage by pivoting the second portion 14 to cover the first portion 12 about the hinge 50. The fully-folded portable display device, as shown in FIG. 6, is small and compact with superior portability. The portable display device adopting the flexible electrophoretic display 20, can be configured to be folded in a variety of ways as desired.

Figure 7:
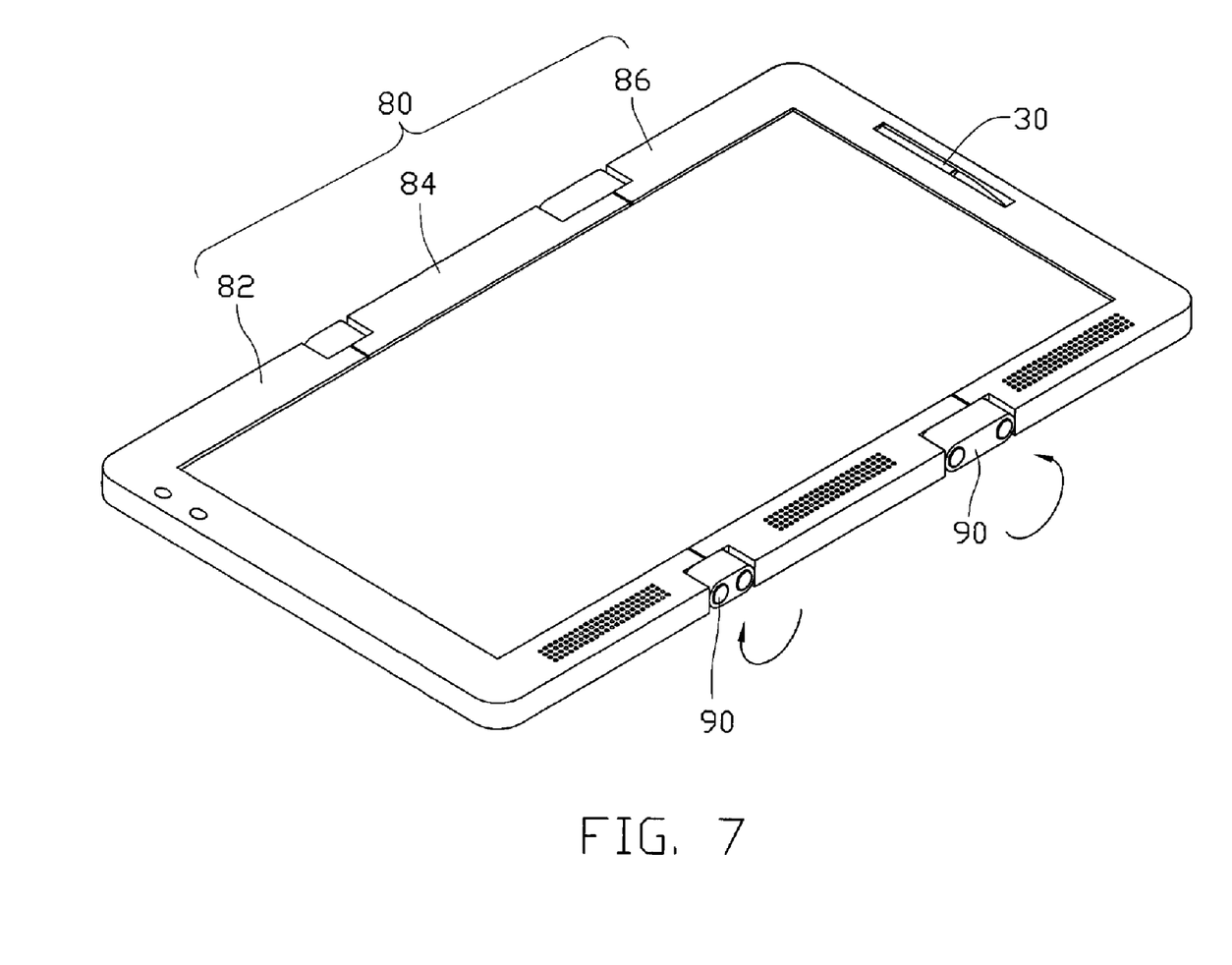
FIG. 7 is an isometric view of a portable display device in accordance with a second embodiment.

Referring to FIG. 7, a portable display device in accordance with a second embodiment is illustrated. The portable display device includes a base 80, a display 20, a stylus 30, a plurality of buttons 40, a pair of hinges 90, and a circuit board (not shown). The base 80 is divided into a first portion 82, a second portion 84, and a third portion 86. The first, second and third portions 82, 84, 86 of the base 80 are successively pivotably attached by the hinges 90. The portable display device can thus be twice folded to reduce the storage size thereof to one third of its original size, thereby achieving a very compact effect.

As described above, the portable display device adopts an electrophoretic display. The electrophoretic display has low radiation and power consumption, and high definition and contrast. It is suitable for many electronic devices.

It should be emphasized that the above-described embodiments of the present invention, including any preferred embodiments, are merely possible examples of implementation of the principles of the invention, and are merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and be protected by the following claims.

What is claimed is:

1. A portable display device, comprising;
    a flexible electrophoretic display comprising a pair of electrodes for providing an electric field therebetween, and a microcapsule layer positioned between the electrodes;
    a circuit board electrically connected to the electrodes of the display for providing power to the electrodes and controlling the electric field generated between the electrodes;
    a base receiving and securing the display and the circuit board therein, the base comprising at least two portions foldable to each other; and
    a stylus detachably embedded in the base for applying a pressure to the display.

2. The portable display device as claimed in claim 1, wherein the microcapsule layer comprises a plurality of microcapsules with a diameter of 30 to 100 micrometers, and each microcapsule encloses a plurality of electrified particles therein.

3. The portable display device as claimed in claim 2, wherein the particles comprise white particles and color particles, and the white particles and the color particles carry unlike electric charges.

4. The portable display device as claimed in claim 3, wherein each microcapsule further comprises a dispersing medium located between the white particles and the color particles for preventing the white particles and the color particles from gathering due to their mutual attraction.

5. The portable display device as claimed in claim 3, wherein the color particles are selected from a group consisting of red particles, green particles, and blue particles.

6. The portable display device as claimed in claim 1, wherein the display further comprises a pair of substrates sandwiching the electrodes to protect the electrodes and the microcapsule layer from being damaged.

7. The portable display device as claimed in claim 6, wherein the substrates are made of one or more plastic materials, and the display is manufactured by plastic transistor technology.

8. The portable display device as claimed in claim 1, wherein the display further comprises a pressure sensor positioned under one of the electrodes for sensing a pressure applied thereto, and the pressure sensor is connected to the circuit board for activating a pre-determined response.

9. The portable display device as claimed in claim 1, further comprising a plurality of buttons arranged on the base for activating predetermined functions.

10. A portable display device, comprising:
    a flexible electrophoretic display comprising two electrodes for providing an electric field therebetween, and a microcapsule layer between the electrodes, one of the electrodes being transparent;

a circuit board connected to the display for controlling the electric field generated between the electrodes;

a base receiving and securing the display and the circuit board therein, the base being divided into at least two portions;

a stylus removably fixed to the base for entering information on the display; and at least one hinge pivotably attaching the at least two portions of the base together.

11. The portable display device as claimed in claim 10, wherein the display comprises at least one substrate covering one of the electrodes for protecting the display from dust.

12. The portable display device as claimed in claim 10, wherein the display comprises a pressure sensor positioned under one of the electrodes for sensing a pressure applied thereon, and the pressure sensor is connected to the circuit board for transmitting a signal thereto for activating a pro-determined response.

13. The portable display device as claimed in claim 10, wherein the microcapsule layer comprises a plurality of microcapsules, and each microcapsule encloses a plurality of white particles and color particles with unlike electric charges.

14. The portable display device as claimed in claim 13, wherein the color particles are selected from red particles, green particles, and blue particles.

15. A portable display device, comprising:

a base comprising at least two portions foldable to each other;

a flexible electrophoretic display embedded in the base with a viewing surface exposed to outside of the base, the display being foldable with said at least two portions and comprising two electrodes for providing an electric field therebetween, and a microcapsule layer sandwiched between the electrodes;

a stylus removably embedded in the base for entering information on the display; and a circuit board located between the display and the base and electrically connected to the display for controlling the electric field generated between the electrodes.

16. The portable display device as claimed in claim 15, wherein the display further comprises a pair of substrates covering the electrodes respectively.

17. The portable display device as claimed in claim 15, wherein at least one of the electrodes is transparent and adjacent to the viewing surface.

18. The portable display device as claimed in claim 15, wherein the display further comprises a pressure sensor positioned under one of the electrodes for sensing a pressure applied thereon, the pressure sensor being connected to the circuit board for transmitting a signal thereto for activating a pre-determined response.

19. The portable display device as claimed in claim 15, wherein the microcapsule layer comprises a plurality of microcapsules glued together, and each microcapsule encloses therein a plurality of white particles and color particles with unlike electric charges, the white particles and color particles being separated from each other by a dispersing medium.

* * * * *